Feb. 3, 1953 T. A. RICH 2,627,540
GROUND LEAK MEASURING CIRCUIT
Filed Jan. 18, 1951
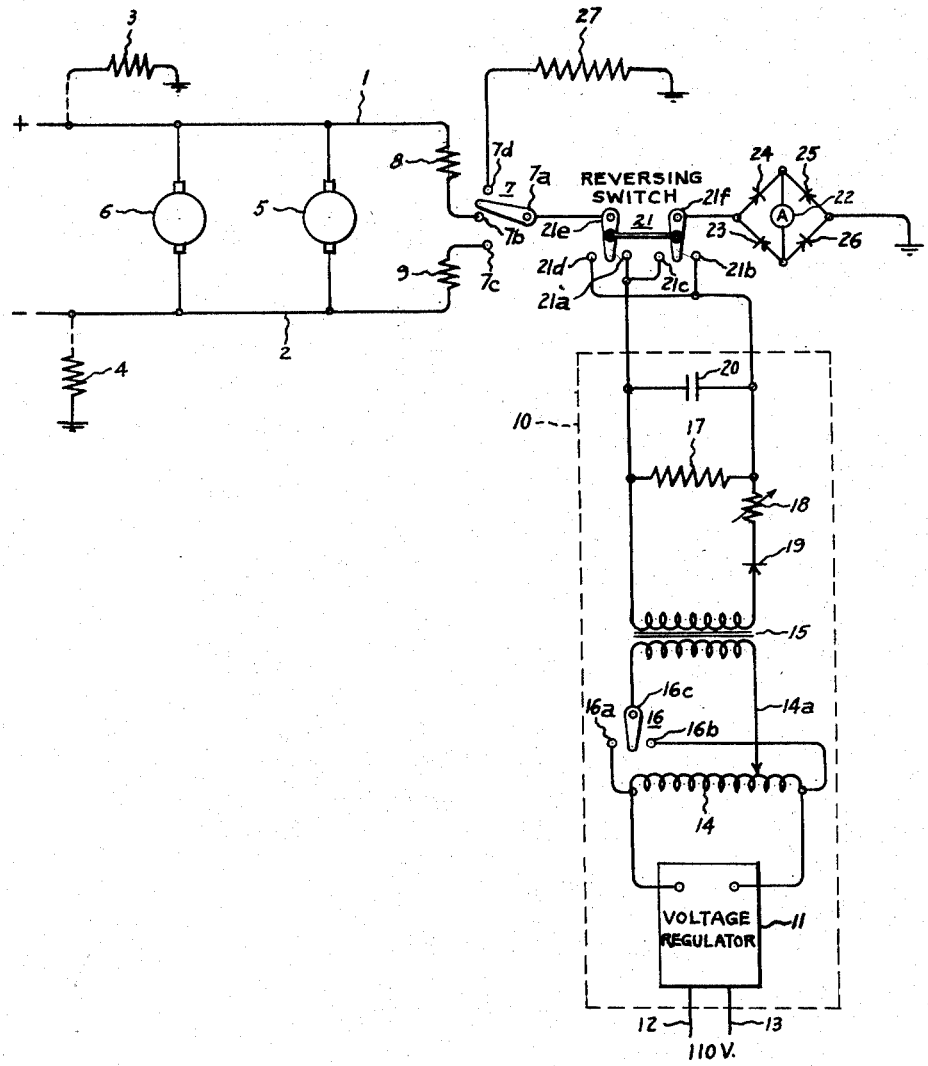
Inventor:
Theodore A. Rich,
by Paul A. Frank
His Attorney.

Patented Feb. 3, 1953

2,627,540

UNITED STATES PATENT OFFICE 2,627,540

GROUND LEAK MEASURING CIRCUIT

Theodore A. Rich, Schenectady, N. Y., assignor to General Electric Company, a corporation of New York Application January 18, 1951, Serial No. 206,570

5 Claims. (Cl. 175—183)

My invention relates to ground leak measuring circuits and, more particularly, to circuits for measuring the leakage resistance to ground of energized transmission lines.

On naval vessels employing direct current transmission lines, it is advisable that any grounds on the transmission lines be detected before they become serious. If both sides of any one transmission line should become grounded, there would, of course, be a short circuit on the power supply which could seriously impair the over-all operation of the vessel, as well as cause extensive damage to expensive equipment. Consequently, it is desirable to determine the leakage resistance to ground of the transmission line from time to time in order to calculate the possibility of grounds occurring thereon. However, at the present time it is necessary to de-energize a transmission line prior to measuring the leakage resistance, thus such measurements cause some loss in operational efficiency of the vessels. If the vessels are operating under combat conditions, the danger resulting from this loss in operational efficiency may completely preclude taking the measurements, even though the latent defects in the line may present an even more serious danger in the future.

Therefore, an object of my invention is to provide improved means for measuring the leakage resistance to ground of a direct current transmission line while the transmission line is energized.

Another object of my invention is to provide effective, low cost means, which may be conveniently operated by unskilled personnel, for measuring the ground leakage resistance of a direct current transmission line while the transmission line is energized.

In carrying out my invention in one embodiment thereof, to measure the leakage resistance from an energized transmission line to ground, I connect first one and then another of the conductors of the line to ground by a circuit consisting of an indicating device, a reversible source of voltage of known value, and a current limiting resistor, all connected in series.

The features of my invention which I believe to be novel are set forth with particularity in the appended claims. My invention itself, however, both as to its organization and mode of operation, together with further objects and advantages thereof, may best be understood by reference to the following description taken in connection with the accompanying drawing. The single figure of the drawing is a schematic diagram of a direct current transmission system, together with a ground detector circuit embodying my invention.

Referring to the drawing, a direct current transmission line consists of the supply conductors 1 and 2. The transmission line has a certain leakage resistance to ground, as is indicated by the resistors 3 and 4. A direct current voltage, for example, 1000 volts, is supplied to the transmission line by a source of direct voltage, such as generator 5. Various loads, such as motor 6, are connected across the transmission line.

A first selector switch 7, having a selector member 7a, is provided for selecting the conductor to be checked for the presence of a ground. Any convenient number of supply conductors may be checked by a single ground detector system, as hereinafter described, by simply connecting the supply conductors of the transmission line to the various contacts of a selector switch, such as switch 7. The ends of supply conductors 1 and 2 are respectively connected to contacts 7b and 7c of switch 7 through current limiting resistors 8 and 9, resistors 8 and 9 here each having a resistance in the order of 50,000 ohms.

A reversible polarity source 10 of adjustable direct voltage supplies the voltage necessary for measuring the leakage resistance. Source 10 has some predetermined range, such as from zero to 500 volts. Source 10 is used to determine the open circuit voltage to ground at 7b or 7c and to change this potential by a known amount, such as 500 volts. In source 10, the input or source terminals of a voltage regulator 11 are connected to alternating current supply conductors 12 and 13.

Voltage regulator 11 may be any of the various types of regulators which produce a substantially constant voltage at their output terminals under varying source voltages at their input terminals. For example, a well known type of regulator which may be used is the type that employs an electron discharge device, such as a vacuum tube diode, to control the current in one winding of a saturable reactor. The load current passes through another winding of the reactor. The emission of the diode, which fluctuates with the source voltage, changes the field strength of the reactor so that the voltage drop across the reactor in the load circuit rises with an increase in source voltage and falls with a decrease in source voltage and thereby keeps the output voltage of the regulator substantially constant.

The substantially constant voltage output terminals of voltage regulator 11 are connected to the fixed terminals of a variable inductance, such as the variable ratio autotransformer 14. The primary winding of a transformer 15 is connected between the adjustable tap or slider arm 14a of transformer 14 and the selector member 16c of a second selector switch 16. The fixed terminals of transformer 14 are each connected to a different contact of selector switch 16, one terminal being connected to contact 16a and the other being connected to contact 16b. A bleeder resistor 17, a variable resistor 18, and a rectifier, such as selenium rectifier 19, are connected in a closed series circuit across the secondary winding of transformer 15.

A capacitor 20 is connected in parallel relation with resistor 17. The terminals of capacitor 20 are connected to the input terminals 21a and 21b of a reversing switch 21, input terminals 21a and 21b being respectively further connected to input terminals 21c and 21d. By throwing switch 21 to one closed position, terminals 21a and 21b are connected respectively to output terminals 21e and 21f, while, throwing it to the other closed position, terminals 21c and 21d are connected respectively to terminals 21f and 21e.

If the selector member 16c of switch 16 is moved to contact 16a, and slider 14a is in the extreme right-hand position, the maximum voltage appears across capacitor 20, for example, 500 volts. However, zero voltage appears across capacitor 20 if selector member 16c is moved to contact 16b and slider 14a is left in the above position. When slider 14a is in any other position and selector member 16c is closed to contact 16a, a portion of the aforesaid maximum 500 volts appears across capacitor 20. The complement of that portion appears across capacitor 20 if selector member 16c is moved to contact 16b, slider 14a not being disturbed. By the complement of a portion of the voltage, it is meant the maximum voltage available minus that portion. To use a numerical example, if the maximum voltage available across capacitor 20 were 500 volts, and 200 volts were actually applied, the complement of 200 volts would be 300 volts.

A current responsive resistance indicating device, such as ammeter 22 calibrated to read in ohms, is used to indicate the resistance from the contacts of switch 7 through the transmission line and the leakage resistance to ground. Since the direction of current flow in the ground detector circuit depends upon the position of selector switch 7 with respect to the supply conductors 1 and 2, ammeter 22 is connected across the output or meter terminals of a bridge-type rectifying circuit comprising four rectifying elements, such as the selenium rectifiers 23, 24, 25 and 26. The supply terminals of the bridge-type rectifying circuit are serially connected with reversible power supply 10 between selector member 7a of switch 7 and ground.

A calibrating resistor, such as the 50,000 ohm resistor 27, is connected between a contact 7d of switch 7 and ground. To check the operation of the ground detector circuit, selector member 16c of switch 16 is moved to contact 16a, slider member 14a is moved to the extreme right-hand position, reversing switch 21 is moved to one of its closed positions, such as connecting contacts 21e and 21f, respectively, with contacts 21a and 21b, and selector member 7a is closed to contact 7d. Meter 22 should then indicate 50,000 ohms resistance between switch 7 and ground. However, if the output voltage of power supply 10 has fluctuated from the predetermined value of 500 volts, meter 22 will indicate some resistance greater or less than 50,000 ohms, depending upon the direction of fluctuation of the voltage of power supply 10. The voltage of power supply 10 may be brought back to 500 volts by adjusting variable resistor 18, thereby causing meter 22 to read 50,000 ohms.

Now, if the ground detector circuit is connected to either of the transmission line conductor 1 or 2 by means of switch 7, since the internal resistance of generator 5 is very small when compared to the resistance of current limiting resistors 8 or 9, generator 5 acts as a short circuit across the transmission line as far as the ground detector circuit is concerned. Meter 22 then reads the resistance of one of the current limiting resistors in series with the parallel combination of the leakage resistances 3 and 4.

To check the transmission line for the presence of a ground, selector member 16c of switch 16 is moved to contact 16a and slider 14a is moved to the extreme left-hand position so that zero voltage appears across contacts 21a and 21b. With reversing switch 21 in one of its closed positions, switch 7 is moved to the contact which gives the least resistance reading, i. e., the highest current, in meter 22, assuming meter 22 to be a resistance calibrated ammeter. If it is assumed that supply conductor 1 has been partially grounded, and conductor 2 is not grounded, the smallest resistance reading on meter 22 will be obtained when the selector member of switch 7 is moved to contact 7b. In any case, the contact is selected which gives the smallest meter reading. Slider 14a is then moved from the zero position and if the meter reading decreases or the deflection becomes greater, switch 21 is reversed. Next, slider 14a is adjusted to obtain zero deflection on meter 22. Now, assuming that contact 7b originally gave the smallest meter reading, the zero deflection of meter 22 indicates that the output voltage of power supply 10 is equal and opposite to the potential appearing on contact 7b. No current flows through meter 22 and, therefore, the voltage measured is the voltage from conductor 1 to ground. If the wrong contact, i. e. the one giving the larger meter reading, were chosen originally, it would be impossible to balance out its voltage to ground since the voltage to ground would be larger than the voltage available from source 10, and thus no zero deflection could be obtained on the meter.

The selector member 16a of switch 16 is now moved to contact 16b and switch 21 is reversed. The complement of the last-mentioned output voltage of power supply 10 is thereby connected with opposite polarity into the ground detector circuit so that the total voltage appearing on contact 7b is 500 volts. The amount of current that now flows through meter 22 is a function of the leakage resistance to ground and the meter can be calibrated to read leakage resistance in ohms by comparison with the reading obtained when 500 volts was applied to the calibrating resistor 27. If contact 7c had originally given the smallest meter deflection when zero voltage was supplied from source 10, the identical procedure would have been followed with contact 7c rather than contact 7b connected to the ground detector circuit by selector member 7a.

The principle of operation of the ground detecting circuit may be illustrated by assuming the example of any linear network which has two available terminals and has no source of potential in its meshes. The resistance between the two terminals may be determined by applying a known voltage, measuring the current, and then applying Ohm's law $$R = \frac{E}{I}$$

in the usual fashion. Although it is not usually done, suppose two determinations of current and voltage were made and the tests were identified by the subscripts $a$ and $b$. Now, since $$R = \frac{E_a}{I_a}$$

and $$R = \frac{E_b}{I_b}$$

it then follows that $$R = \frac{E_a + E_b}{I_a + I_b}$$

Even if there are sources of potential in the mesh, the above results still hold true. In this application, the open circuit voltage is determined in the first operation by moving slider $14a$ until the current is zero, so that there is a value determined for $E_b$ and $I_b = 0$. They, by changing selector member $16c$ of switch $16$ from contact $16a$ to contact $16b$, and by reversing switch $21$, a voltage of $500 - E_b$ is applied to point $7$. Then, substituting in the above formula for determining resistance by two determinations of voltage and current, $$R = \frac{500 - E_b + E_b}{I_a} = \frac{500}{I_a}$$

and the result is indicated on meter $22$. Of course, R equals the resistance of one of the current limiting resistors in series with the parallel combination of the leakage resistances.

While my invention has been described by reference to a particular embodiment thereof, it will be understood that this is by way of illustration of the principles involved and that those skilled in the art may make many modifications in the arrangement and mode of operation, as well as in the values stated as examples for the circuit constants and voltages. Therefore, I contemplate by the appended claims to cover any such modifications as fall within the true spirit and scope of this invention.

What I claim as new and desire to secure by Letters Patent of the United States is:

1. For use with a direct current power transmission system having a source of direct voltage, a pair of supply conductors supplied from said source, and a pair of current limiting resistors each having a resistance that is relatively large in comparison with the internal resistance of said source and each having a terminal connected to a different one of said supply conductors and a remote terminal; a source of reversible polarity direct voltage having output terminals and having switching connections for selectively deriving at said output terminals a maximum voltage, an adjustable portion of said maximum voltage or the difference between said portion and said maximum voltage, a current responsive resistance indicating device having a ground connection terminal and having its opposite terminal connected to one of said output terminals, and a selector switch for selectively connecting the other of said output terminals to said remote terminals of said current limiting resistors.

2. For use with a direct current power transmission system having a source of direct voltage, a pair of supply conductors supplied from said source, and a pair of current limiting resistors each having a resistance that is relatively large in comparison with the internal resistance of said source and each having a terminal connected to a different one of said supply conductors and a remote terminal; a source of reversible polarity direct voltage having output terminals and having switching connections for selectively deriving at said output terminals a maximum voltage, an adjustable portion of said maximum voltage or the difference between said portion and said maximum voltage; a bridge-type rectifying circuit having meter terminals and having a supply terminal connected to ground and a supply terminal connected to one of said output terminals; a current responsive resistance indicating device connected across said meter terminals; a calibrating resistor having a remote terminal and a ground connection terminal; and a selector switch for selectively connecting the other of said output terminals to said remote terminals of said current limiting resistors or to said remote terminal of said calibrating resistor.

3. For use with a direct current power transmission system having a source of direct voltage, a pair of supply conductors supplied from said source, and a pair of current limiting resistors each having a resistance that is relatively large in comparison with the internal resistance of said source and each having a terminal connected to a different one of said supply conductors and a remote terminal; a voltage regulator having source terminals and constant voltage terminals; an autotransformer having an adjustable tap and having fixed terminals respectively connected to said constant voltage terminals; a transformer having a secondary winding and having a primary winding connected at one end thereof to said adjustable tap; a first selector switch for selectively connecting the other end of said primary winding to said fixed terminals; a closed series circuit including said secondary winding; a rectifying element, an adjustable resistor and a bleeder resistor; a filter capacitor connected in parallel with said bleeder resistor; a reversing switch having output terminals and having input terminals connected across said capacitor; a bridge-type rectifying circuit having meter terminals and having a supply terminal connected to ground and a supply terminal connected to one of said output terminals; a current responsive resistance indicating device connected across said meter terminals; a calibrating resistor having a remote terminal and a ground connection terminal; and a second selector switch for selectively connecting the other of said output terminals to said remote terminals of said current limiting resistors or to said remote terminal of said calibrating resistor.

4. A leakage resistance measuring circuit for use with a direct current power transmission system including a source of direct voltage coupled across a pair of supply conductors, said resistance measuring circuit comprising a source of reversible polarity direct voltage having output terminals and having switching connections for selectively applying at said output terminals a maximum voltage, an adjustable portion of said voltage, or the difference between said portion and said maximum voltage, a current responsive indicating device having one terminal thereof connected to ground and having the remaining terminal thereof connected to one of the output terminals of said reversible polarity voltage source, a resistor connected to each one of said supply conductors, and a selector switch having a movable switch arm for selectively connecting the remaining one of said reversible polarity voltage source output terminals to a desired one of said supply conductors through the respective resistor thereof.

5. The combination set forth in claim 4 further characterized by a calibrating resistor having one of the terminals thereof connected to ground and the remaining terminal thereof selectively engageable with the movable switch arm of said selector switch.

THEODORE A. RICH.

REFERENCES CITED

The following references are of record in the file of this patent:

UNITED STATES PATENTS

| Number | Name | Date |
| --- | --- | --- |
| 1,055,018 | Burnham | Mar. 4, 1913 |
| 2,010,243 | Preisman | Aug. 6, 1935 |
| 2,179,901 | Smith | Nov. 14, 1939 |
| 2,594,994 | Rich | Apr. 29, 1952 |